May 12, 1964   H. I. BERMAN   3,132,396
CLIP
Filed Nov. 1, 1961

Herbert I. Berman
INVENTOR.

BY
Attorneys

United States Patent Office 3,132,396
Patented May 12, 1964

3,132,396
CLIP
Herbert I. Berman, Lancaster, Pa., assignor to Penn-Chem Corporation, Lancaster, Pa., a corporation of Pennsylvania
Filed Nov. 1, 1961, Ser. No. 149,292
1 Claim. (Cl. 24—27)

This invention relates to clips, and more particularly to resilient clips for clamping the ends of flexible tubes and hoses onto rigid pipe fittings.

Accordingly, it is a primary object of this invention to provide a simplified and improved resilient clip for clamping the ends of flexible tubes and hoses to rigid fittings.

It is another object of the invention to provide an improved resilient clip that may be applied to tubes without the need for any special tools and without requiring any special skill on the part of the operator.

It is another object of the invention to provide an improved resilient clip that may be easily operated by one hand of the operator.

It is yet another object of the invention to provide an improved clip that may be instantaneously removed and applied from or to a tube.

It is still another object of the invention to provide a resilient clip for flexible tubes having integral means thereon for locking it securely in closed position.

It is another object of the invention to provide an improved clip that is composed of one integral piece of resilient wire or stock material and is thereby of extreme economical construction, light in weight, durable in use and requires no maintenance.

It is still another object of the invention to provide an improved resilient clip for clamping the ends of flexible tubes to any type of nipple or connector, but is particularly adapted for connecting the ends of tubes to serrated nipples.

A further object of the invention is to provide a novel clip which because of its design and resiliency may be used on tubes having a variety of outside diameters.

It is yet another object of the invention to provide a novel clip which may be inserted radially onto a tubular member, and it is not necessary that the clip be installed over the end of the tube which in many applications is impossible.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1:
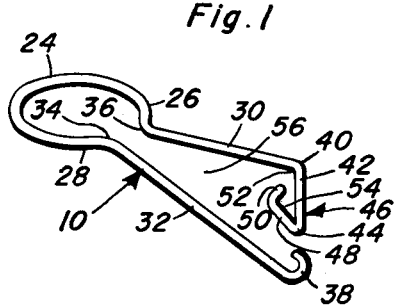
FIGURE 1 is a perspective view showing this novel clip.
Figure 2:
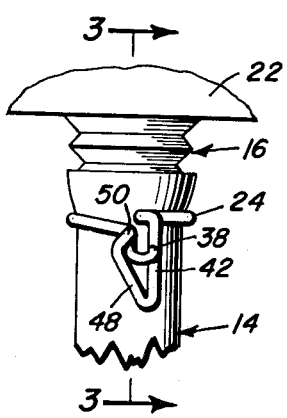
FIGURE 2 is a plan view showing the clip installed on a tube and holding the end of the tube to a rigid nipple.

With continuing reference to the drawings wherein the same reference numerals in the various views indicate identical parts, it can be seen that the novel clip 10 is adapted to encircle the end 12 of a flexible tube or hose 14 for securing it to a nipple 16.

The tube 14 may be composed of any conventional flexible material such as synthetic rubber, natural rubber, plastic, composition, impregnated cloth, etc. The nipple or connector 16 is preferably of a frusto-conical shape and has a serrated outer surface comprising a plurality of annular ridges 18 separated by annular V-shaped grooves 20. However, the nipples could be of constant diameter and have a smooth outer surface. The nipple may be composed of rigid materials such as glass, metal, plastic, etc. The nipple 16 is hollow and connected to a supply pipe or reservoir 22.

The spring clip is preferably composed of a flexible resilient material such as piano wire, but could be composed of other resilient materials.

The clip 10 comprises a substantially circular body portion 24 extending through an arc of approximately 200° to 320° and terminating in spaced ends 26 and 28. A pair of radially outwardly extending and diverging arms or legs 30 and 32 of different lengths are connected to the ends 26 and 28 by arcuate bends 34 and 36 of a relatively small radii. The body 24 and arms 30 and 32 are substantially coplanar.

The outer end of the arm 32 extends beyond arm 30 and is formed into a U-shaped hook 38 also coplanar with the body 24. This hook provides a smooth end for arm 32 to prevent catching clothing or damaging fingers.

The arm 30 is deflected at its outer end at 40 and 44 to form a V-shaped hook 46 having legs 42 and 48. The leg 48 is shorter than the leg 42 and the outer end thereof is bent inwardly at approximately a 45° angle to provide a flange 50 which partially closes the opening or mouth 52 of the V-shaped hook 46 and provides a V-shaped notch 54. The legs 42 and 48 and the flange 50 are all coplanar, are arranged in a generally triangular pattern, and may lie in a plane substantially perpendicular to the plane of the arms 30 and 32. The arms 30 and 32 diverge outwardly from the ends 28 and 26 of the body 24 so as to form a converging or cam shaped mouth or entry opening 56 leading into the space provided between the ends 26 and 28 of body 24.

In operation, the end 12 is forced axially onto the outer surface of the nipple 16 in telescoping relationship. The spring clip 10 is then moved towards the end 12 of the tube 14 so that the plane of the clip is substantially perpendicular to the axis of the tube and the end 12 passes between the hooks 38 and 46 and into the converging or cam shaped opening 56. Alternatively, the clip may be applied on the tube before the tube is inserted on the nipple. The inside diameter of the body 24 is substantially the same or slightly less than the outside diameter of the tube 14. The clip 10 may be slightly moved so that the body 24 will become aligned with one of the grooves 20. The arms 30 and 32 are then pressed together so that the arm 32 enters the mouth 52 and then the clip is released. This whole operation may be performed easily with one hand of the operator. When the clip is released, the resilience thereof causes the hooks 38 and 46 to separate whereupon the hooks 38 move into the V-shaped notch 54.

Figure 3:
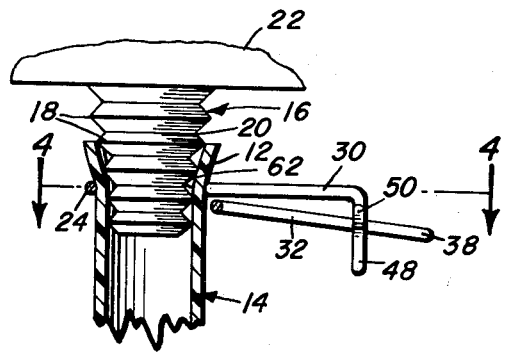
FIGURE 3 is a vertical cross-sectional view taken substantially on the plane of line 3—3 in FIGURE 2.
Figure 4:
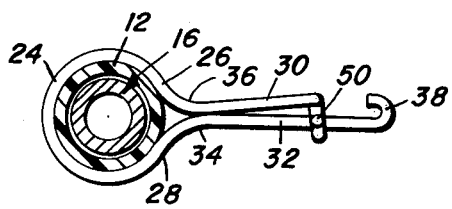
FIGURE 4 is a vertical cross-sectional view taken substantially on the plane of line 4—4 in FIGURE 3.

When the arms 30 and 32 are forced together, the ends 28 and 26 of body 24 are drawn together for decreasing the diameter of the body whereupon it tightly grips and contracts the outer surface of end 12 for forcing the inner surface thereof tightly into sealing engagement with the ridges 18. As shown in FIGURE 3 at 62, the body 24 deflects an annular portion of the end 12 into one of the recesses 20 thereby providing an inner annular groove on the inner surface of the tube for preventing axial separation of the tube and nipple.

To separate the hook from the tube, it is only necessary to urge the outer ends of arms 30 and 32 together and laterally slide arm 32 out of flange 50 and then release the clip. The clip may then be removed from the tube by using the reverse process of installing it.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A spring clip comprising a substantially annular body terminating in spaced ends, a pair of legs, the inner ends of the legs being fixed to said body ends, said legs extending radially outwardly of the body in diverging relation to each other, said annular body and said legs being coplanar and being formed of a single piece of spring wire, a first one of the legs of said pair of legs being shorter than the other and terminating in a downwardly extending hook means consisting of a first portion perpendicular to the plane of the legs and body, said portion terminating in an upwardly angled second portion extending toward but stopping short of the second one of said pair of legs, said second portion terminating in an upwardly angled third portion extending toward said first leg but stopping short thereof and below the plane of the annular body and legs thereby requiring a compression of the second leg toward the first leg and out of the aforementioned plane so as to engage the second leg within the hook, said second leg being releasably retained below the aforementioned plane against both outward and upward movement by the upwardly angled second and third portions.

References Cited in the file of this patent
UNITED STATES PATENTS

| | | |
|---|---|---|
| 237,976 | Hoffacker | Feb. 22, 1881 |
| 282,466 | Preston | July 31, 1883 |
| 596,642 | Waller | Jan. 4, 1898 |
| 1,245,892 | Ensey | Nov. 6, 1917 |
| 1,281,469 | Wood | Oct. 15, 1918 |
| 1,451,206 | Dow | Apr. 10, 1923 |
| 2,524,562 | Dawbarn | Oct. 3, 1950 |
| 2,628,396 | Grimes et al. | Feb. 17, 1953 |
| 2,947,055 | McHenry | Aug. 2, 1960 |